Jan. 13, 1942.  J. McARTHUR  2,270,070
FISH LURE GUARD
Filed June 17, 1940
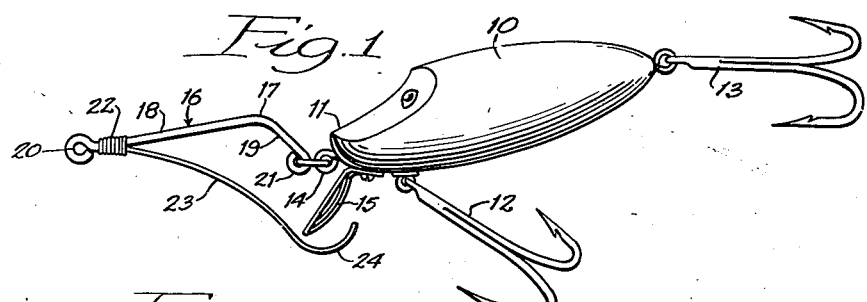
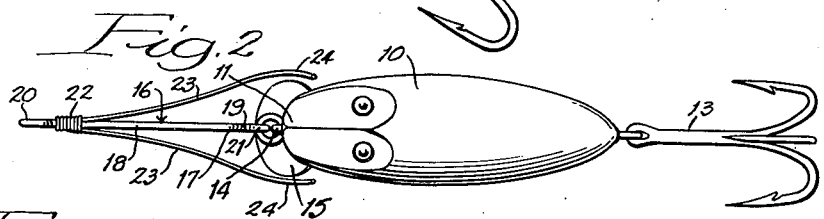
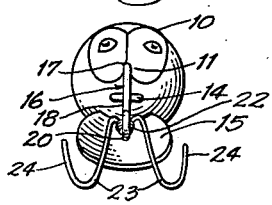
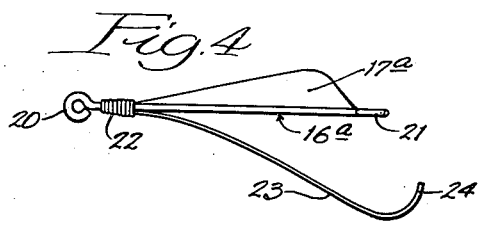
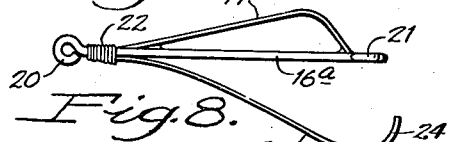
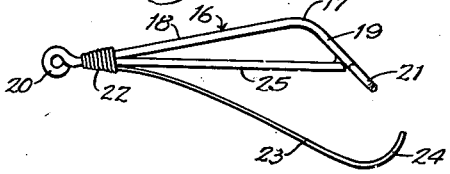
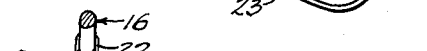
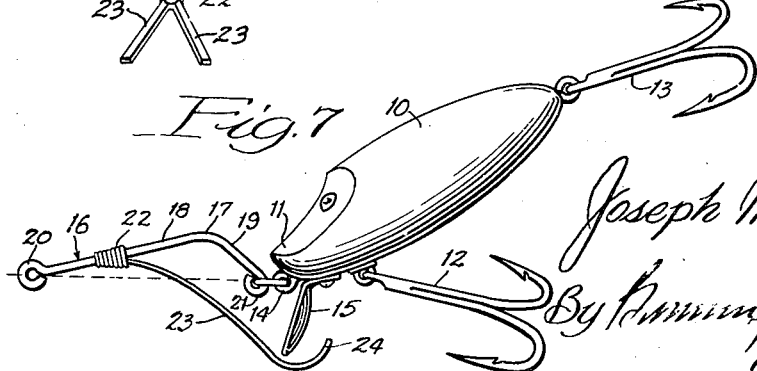
Inventor:
Joseph McArthur,
By [signature]
Attorneys.

Patented Jan. 13, 1942

2,270,070

UNITED STATES PATENT OFFICE 2,270,070

FISH LURE GUARD

Joseph McArthur, Dowagiac, Mich., assignor to James Heddon's Sons, Dowagiac, Mich., a corporation of Michigan Application June 17, 1940, Serial No. 340,935

11 Claims. (Cl. 43—39)

The present invention is directed to a weed guard leader for a fish bait which is designed to protect the body of the lure as a whole, and not merely the hooks thereof, from entanglement with weeds or other obstructions which often lodge against the forward end of the lure even though the hooks themselves are adequately protected.

Notwithstanding the rapidly increasing popularity among fishermen, and the rapidly increasing general use of wooden and composition types of imitation minnows commonly called "plugs" during the past quarter of a century, very little effort, if any, has been made to effectually weed guard such types of lures with a device that would not interfere with the hooking of the fish and would at the same time adequately protect the forward structure of the bait which is usually provided with some form of collar, lip, or other actuating device, which is required to give to the bait the desired diving and darting movements, but which necessarily presents an extended obstruction which, unless guarded, will become entangled with any weeds or other foreign materials which may be encountered.

The present invention is designed to afford in the leader itself the necessary protection for the forward end of the bait in a form which will serve to deflect the weeds or obstructions away from the bait body and hooks, and thus permit the bait as a whole to ride freely through various types of aquatic vegetation, snags, stones, or other obstructions, without becoming entangled therewith.

Further objects will appear from a detailed description of the invention in conjunction with the accompanying drawing, wherein—

Figure 1 is a side elevation of a plug bait showing the guard leader of the present invention in its most simplified form;

Fig. 2 is a top view of the same;

Fig. 3 is a front elevation of the same;

Figs. 4, 5 and 6 show various modified forms of the leader guard;

Fig. 7 is a modification in the manner of attaching the guard prongs to the leader; and Fig. 8 is an enlarged sectional view taken on line 8 of Fig. 1, looking in the direction of the arrows.

The leader guard in any of the forms shown may be attached to the forward end of a bait body 10 which for purpose of illustration merely is shown as a typical plug bait of ovate formation, terminating at its forward end in a tip or nose 11 and provided with the usual forward gang of hooks 12 and a tail gang 13. It will be understood, however, that the guard leader is adapted for use with numerous forms of the bait body although it is particularly efficacious when used as a connection for a plug bait having a line tie 14 located at the forward end and somewhat below the tip or nose of the bait. Such a bait, unless adequately protected, affords at its forward end an abrupt obstruction which, when dragged through weeds or other obstructions, will become quickly befouled.

The leader guard in exemplification of the invention here shown is designed for attachment to the line tie 14 which occupies a position immediately above the depending lip or collar 15 which is ordinarily provided for the purpose of actuating the bait in its diving and darting movements, and which is attached to the under side of the bait body immediately behind the tip end thereof.

As shown in Fig. 1, the guard leader 16 is in the form of a bent section of stiff strong wire provided near its rear end with an upwardly extending bend or elbow 17, which divides the leader into a forward portion 18 and an angularly disposed rear portion 19. The forward portion terminates in an eye or loop 20 to which the line is attached, and the rear portion terminates in an eye or loop 21 which is linked with the line tie 14 of the bait.

The leader has secured thereto by a wire wrapping or otherwise the converging forward ends of a pair of guard prongs 23 of downwardly curving arcuate formation, which are preferably formed of flat strips of spring metal reversely curved upwardly and spread at their rear ends 24 sufficiently to clear the margin of the collar 15 while allowing the bait body to move freely, or to roll upon the linkage connection thus afforded, without engaging the free ends of the guard prongs 23. The prongs may be secured to the leader near the forward end thereof as in Fig. 1, or to the medial elevated portion of the leader as in Fig. 7, which latter arrangement is is preferred for certain purposes.

In actual use the parts will normally assume substantially the position indicated in Fig. 1, with the bait body tilted downwardly by reason of the water resistance at the forward end and with the draft in a substantially horizontal line through the eyes 20 and 21, or in the direction of motion of the line. This causes the bend or elbow 17 to extend upwardly to or above the tip or nose of the bait body, so that weeds or obstructions encountered by the guard leader will be deflected upwardly and over the top of the bait which, being free from hooks, gangs, or other obstructions, will be clear of weeds thus deflected. At the same time the lower guard prongs 23 will deflect weeds or obstructions downwardly below the collar and thus provide a free passage for the bait body with the hook gangs carried thereby, since the deflective movement imparted will ordinarily open up a sufficiently wide passage for the entire bait to avoid entanglement even though the hooks themselves be not otherwise protected.

Although the guard leader in its simplest form may consist merely of a bent or humped wire section of the character first described, the same result may be obtained by various modifications shown in Figs. 4, 5 and 6.

In Fig. 4, a straight leader 16a is shown with the forward and rear eyes 20 and 21, and the deflective action is attained by providing a hump 17a which may be in the form of a triangular metal fin, soldered or otherwise secured to the leader.

In Fig. 5, the straight leader 16a is employed and the hump is provided by the employment of a guard wire 17b secured at its ends to the leader to afford the necessary configuration.

In Fig. 6, a construction is shown similar in all respects to the one first described, with the addition, however, of a brace rod 25 which may be desirable for use with exceptionally strong or large game fish where there may be danger of straightening out the guard leader if additional bracing be not provided. Other modifications of the same idea may conceivably be employed without departing from the principles of the present invention.

Where the guard prongs are secured to the medial or elevated portion of the leader as in Fig. 7, certain additional advantages are realized by reason of the fact that the forward or attached ends of the prongs occupy a position above the line of draft between the forward and rear ends of the guard leader, so that with the prongs thus positioned, when the bait in darting and diving assumes the angular position shown in Fig. 7, the prongs will afford more complete protection for the entire frontal portion of the bait body and provide an open unobstructed channel through the weeds for the passage of the bait body with the hooks attached thereto. This method of attaching the prongs is equally applicable to the various forms of guard leader shown, and is particularly desirable for use with deep diving baits which tend to assume a relatively abrupt angle to the line of draft, as indicated in Fig. 7 by the dot and dash line.

It will be noted from the above description that the guard leader of the present invention combines with the bait body itself in such a way as to afford complete protection for the entire forward end of the bait as a whole by providing a guard so constructed as to afford protective members diverging upwardly, downwardly, and laterally from the single point of convergence, so that weeds or other obstructions will be deflected in various directions away from the forward end of the bait, and particularly from those portions thereof which unless guarded would afford obstructions to the free passage of the bait by providing angles or pockets for the accumulation of weeds or the like as the bait is drawn forwardly through the water.

By providing a leader which is so configured as to diverge upwardly from the normal line of draft, I am enabled to secure the deflective function above described without sacrifice of the draft function, and at the same time afford adequate mounting for the downwardly diverging prongs which serve to completely guard the lower portions of the lure, and particularly the collar which is free to swing or roll upon the linkage as a pivot without contacting the prongs at any point.

The reverse upward curvature of the rear tip ends of the prongs affords a special advantage in preventing fouling of the bait and leader in cases where a fish strikes and starts to run with the bait in the reverse direction, or at angle, in an effort to escape. In such circumstances the upwardly curved free tip ends of the prongs, which extend beyond the margins of the collar, will close the gap which might otherwise permit weeds or obstructions to be caught between the prongs and the guard leader and interfere with the landing of the fish. At the same time the recurved ends of the prongs will prevent them from being caught against obstructions and bent or broken in cases where the bait is being drawn rearwardly in the vicinity of snags or other obstructions. The recurved configuration, therefore, in conjunction with a collar or the like, effectively guards the forward end of the bait against fouling or mutilation under the circumstances mentioned.

It is preferred to form the prongs of flat strips of spring metal in order to afford increased resistance against lateral deflection while providing sufficient stiffness to cause the strips to maintain their intended curvature, which is essential in order to afford the necessary clearance around the margins of the collar to permit freedom of movement of the bait without interference. The prongs, in addition to their deflective function, also serve a ballasting function in maintaining the guard leader in its intended position, with the hump extending upwardly to protect the upper portion of the bait body.

The invention is one which permits of numerous modifications in detail and in configuration of the parts, without departing from the spirit of the invention, so that it will be understood that the particular forms herein shown serve to exemplify the principles involved, and that it is not the intention to limit the invention save as indicated in the claims.

I claim:

1. In combination with a bait body, a guard leader provided at its forward end with means for the attachment of a line and secured at its rear end to the bait body at a point below the forward tip of the bait body and having an elevated hump between its ends to afford a deflecting surface in advance of the forward end of the bait.

2. In combination with a bait body, a guard leader provided at its forward end with means for the attachment of a line and secured at its rear end to the bait body and having an elevated hump between its ends to afford a deflecting surface in advance of the forward end of the bait, and means secured to the guard leader for deflecting weeds or the like downwardly below the bait body.

3. In combination with a bait body, a guard leader provided at its forward end with means for the attachment of a line and secured at its rear end to the bait body at a point below the forward tip of the bait body and humped upwardly between its ends to afford a deflecting surface in advance of the forward end of the bait, and means secured to the guard leader for deflecting weeds or the like downwardly below the bait body.

4. In combination with a bait body, a guard leader provided at its forward end with means for the attachment of a line and secured at its rear end to the bait body and humped upwardly between its ends to afford a deflecting surface in advance of the forward end of the bait, and a plurality of rearwardly and downwardly diverging prongs secured at their forward ends to the guard leader for protecting the under portion of the bait body.

5. In combination with a bait body, a guard leader provided at its forward end with means for the attachment of a line and secured at its rear end to the bait body at a point below the forward tip of the bait body and humped upwardly between its ends to afford a deflecting surface in advance of the forward end of the bait, and a plurality of rearwardly and downwardly diverging prongs secured at their forward ends to the guard leader for protecting the under portion of the bait body.

6. In combination with a bait body, provided near its forward end with a downwardly projecting resistance element and an eye between said element and the tip of the bait, a guard leader having at its rear end an eye interlinked with the first mentioned eye and having in its forward end an eye for the securement of a line, the intermediate portion of the leader being provided with an elevated hump adapted when the bait is in forward motion to extend above the tip of the bait and serve as a deflector for weeds or the like, and a plurality of guard prongs diverging downwardly and laterally at their rear ends to clear the resistance element and secured at their convergent forward ends to the guard leader near the forward end thereof.

7. In combination with a bait body, a guard leader provided at its forward end with means for the attachment of a line and secured at its rear end to the bait body and humped upwardly between its ends to afford a deflecting surface in advance of the forward end of the bait, and a plurality of rearwardly and downwardly diverging prongs secured to the guard leader for protecting the under portion of the bait body, the free ends of the prongs being recurved upwardly.

8. In combination with a bait body, a guard leader provided at its forward end with means for the attachment of a line and secured at its rear end to the bait body and humped upwardly between its ends to afford a deflecting surface in advance of the forward end of the bait, and a plurality of rearwardly and downwardly diverging prongs secured to the guard leader above the line of draft between the forward and rear ends thereof for protecting the under portion of the bait body, the free ends of the prongs being recurved upwardly.

9. In combination with a bait body, provided near its forward end with a downwardly projecting resistance element, a guard leader secured to the forward end of the bait and adapted at its forward end for the securement of a line, the intermediate portion of the leader being provided with an elevated hump adapted when the bait is in forward motion to extend above the line of draft and serve as a deflector for weeds or the like, and a plurality of guard prongs diverging downwardly and laterally, and recurved upwardly at their rear ends to clear the resistance element and secured at their convergent forward ends to the guard leader.

10. In combination with a bait body, provided near its forward end with a downwardly projecting resistance element, a guard leader secured to the forward end of the bait and adapted at its forward end for the securement of a line, the intermediate portion of the leader being provided with an elevated hump adapted when the bait is in forward motion to extend above the line of draft and serve as a deflector for weeds or the like, and a plurality of guard prongs diverging downwardly and laterally, and recurved upwardly at their rear ends to clear the resistance element and secured at their convergent forward ends to the guard leader at a point above the line of draft between the opposite ends of the guard leader.

11. In combination with a plug bait body, a guard leader freely linked at its rear end to the forward end of the bait body and having an intermediate hump extending upwardly above the line of draft between the opposite ends of the leader and adapted to deflect weeds or the like above the forward tip end of the bait body.

JOSEPH McARTHUR.